Feb. 23, 1965   W. H. ABILDGAARD   3,170,194
GLOVE MOLD
Filed Aug. 14, 1961   2 Sheets-Sheet 2
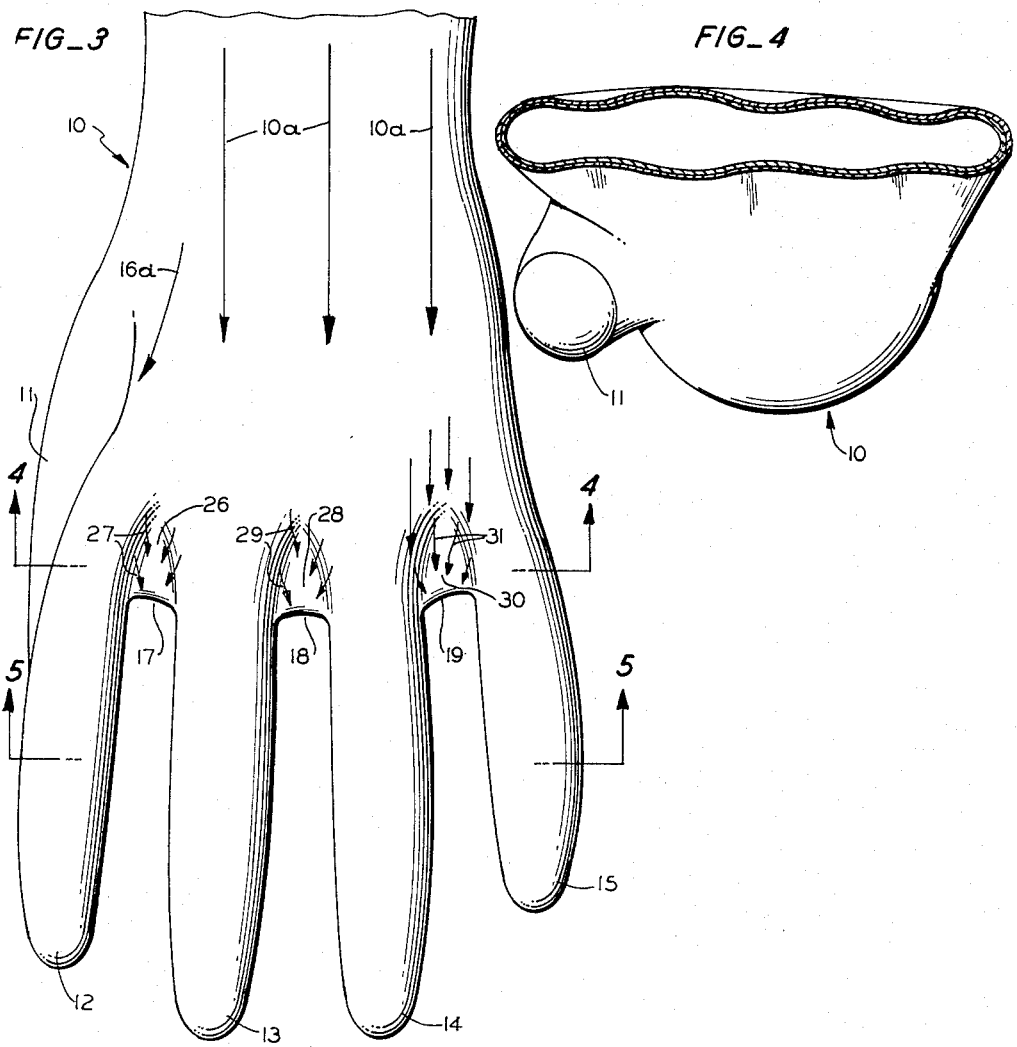
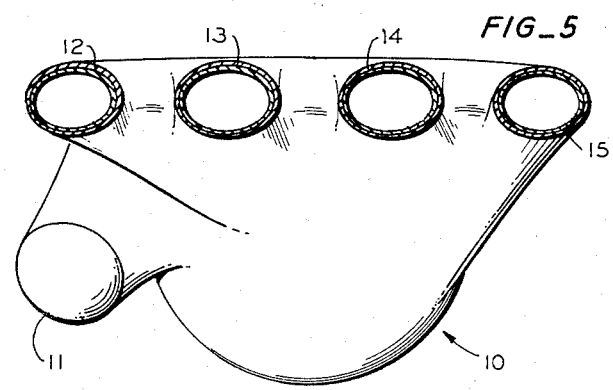
INVENTOR.
WILLIAM H. ABILDGAARD
BY
*Allen and Chromy*
ATTORNEYS

United States Patent Office 3,170,194
Patented Feb. 23, 1965

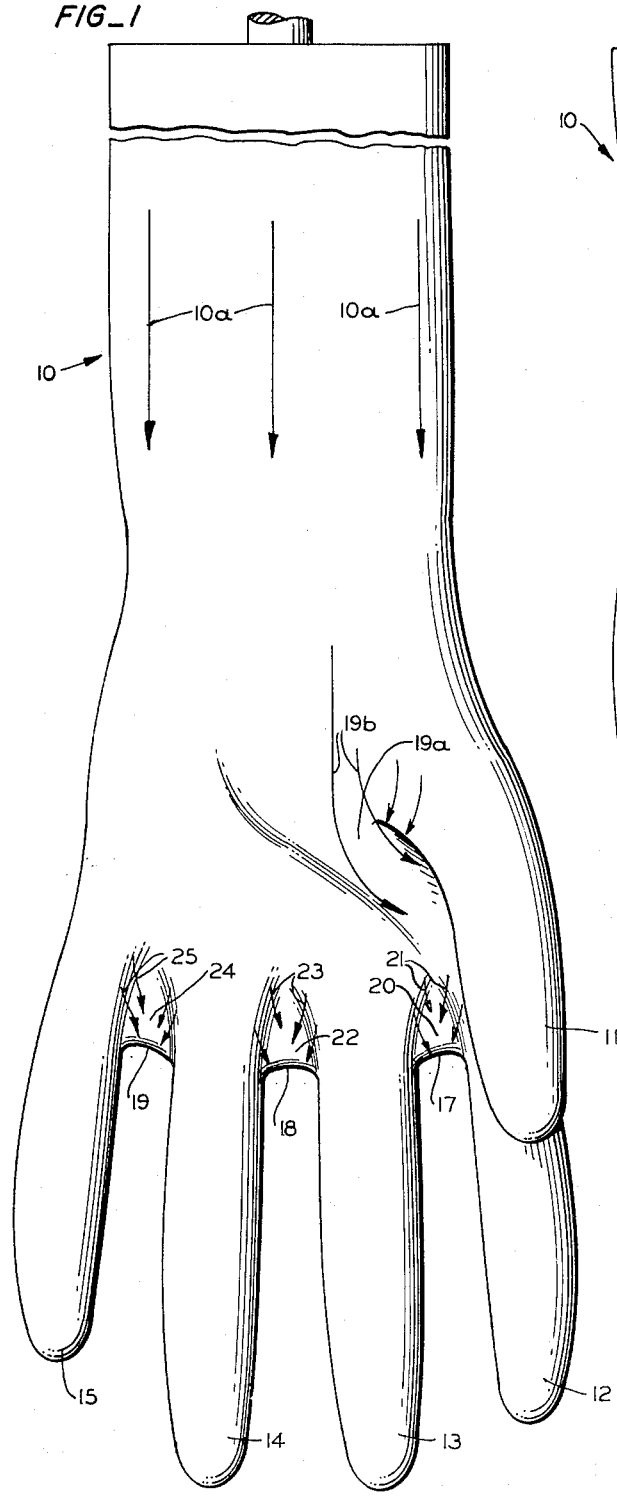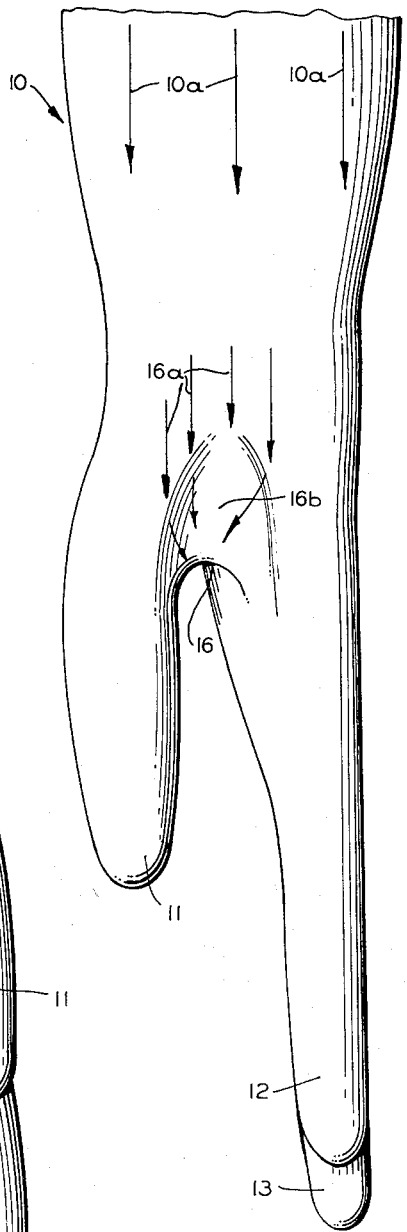

3,170,194
GLOVE MOLD
William H. Abildgaard, Sunnyvale, Calif., assignor to Plastomeric Products Corporation, San Jose, Calif., a corporation of California
Filed Aug. 14, 1961, Ser. No. 131,204
4 Claims. (Cl. 18—41)

This invention relates to molds for use in making gloves and the like.

An object of this invention is to provide an improved mold for use in making gloves and the like from liquid plastic materials.

Another object of this invention is to provide an improved plated mold for making gloves and the like out of plastic materials, said mold being shaped with the cross-section of the fingers somewhat oval or flattened in a direction parallel to the palm so that plating material is thrown onto the web parts between the fingers more readily.

Still another object of this invention is to provide an improved mold for making gloves out of plastic materials, said mold being provided with shallow channels or depressions for guiding the flow and distribution of the liquid plastic materials over the mold surfaces.

A further object of this invention is to provide an improved glove mold for making gloves out of liquid plastic materials, said mold having liquid plastic guiding channels formed in the palm side and in the back side thereof for guiding the flow and distribution of the liquid plastic toward the webs between the roots of the fingers of the mold so that the areas between the fingers receive more of the liquid plastic material then they would normally receive whereby the webs between the fingers of the glove produced on the mold are suitably strengthened.

Other and further objects of this invention will be apparent to those skilled in the art to which it relates from the following specifications, claims and drawing.

In accordance with this invention there is provided an improved mold for use in making gloves and the like from liquid plastic materials.

The mold of this invention is preferably made of hollow construction and comprises a thin shell of copper or similar metal which is plated with a thin coating of nickel or the like so that the thermal capacity of the mold is relatively small. The mold is made with the fingers projecting therefrom well spaced, and actually the spacing between the fingers is commensurate with the spacing between the fingers of a hand when they are spread apart. Thus the webs between the fingers correspond substantially to the webs of the natural hand with the fingers spread apart.

The palm side and the back side of the mold are provided with shallow channels or depressions leading to the web parts between the fingers so that, as the liquid material applied to the mold flows down the mold, it is guided to these web parts of the mold whereby the webs between the fingers of the glove formed from the plastic material receive a substantially greater amount of the liquid plastic than they would normally receive. Consequently, special precautions are taken in this mold to provide additional plastic material to the normally weak areas so that these parts of the molded glove produced on this mold are strengthened.

Further details of this invention will be apparent to those skilled in the art to which it relates from the following specifications, claims and drawing in which:

FIG. 1 is a front view showing the plam side of this glove mold;

FIG 2 is a side view showing the thumb side of this mold;

FIG. 3 is a view of the back side of this mold;

FIG. 4 is a sectional view taken along the line 4—4 of FIG. 3; and

FIG. 5 is a section view taken along the line 5—5 of FIG. 3.

Referring to the drawing in detail, reference numeral 10 designates the body of this mold which is preferably a hollow metallic shell having the general configuration of the human hand. The mold shell may be made of an inner layer of copper or similar metal to which is applied by suitable electro-plating or chemical plating a thin layer or coat of nickel or similar metal with the result that the mold has a relatively small thermal capacity.

This mold may be used for molding or forming gloves and the like from liquid plastic materials either by spraying the liquid plastic material thereon while the mold is supported vertically in the position shown in the drawing so that the liquid flows down the mold as shown by the arrows 10a and by the other arrows, or the mold may be coated with liquid plastic material by dipping it into a container of the liquid plastic material and thereafter withdrawing it from said container of liquid.

The mold 10 is provided with fingers 11, 12, 13, 14 and 15 which are well spaced as shown so that the webs 16, 17, 18 and 19 therebetween are stretched substantially as they would be when the fingers of the hand are spread apart. Thus the web 17 between the fingers 12 and 13, the web 18 between the fingers 13 and 14, and the web 19 between the fingers 14 and 15 each have a length corresponding substantially to that with the fingers spread apart. The fingers 12, 13, 14 and 15 are positioned substantially parallel to each other and the thumb 11 also assumes a substantially parallel position with respect to the other fingers. Thus in the glove produced on this mold, the normal unstretched condition of the fingers thereof would assume a substantially parallel position with sufficient material in the webs 16, 17, 18 and 19 to permit the wearer of the glove so formed to spread apart the fingers of his hand and the glove covering same without materially stretching these webs.

The palm side of the hand is provided with shallow channels or depression 19a, 20, 22 and 24. The channel or depression 19a forms a rather sweeping turn around the palm side of the root of the thumb 11 so that the liquid plastic material flowing down the mold, as indicated by the arrows 19b, is guided to the web portion 16 between the thumb and the root or bottom portion of the forefinger 12. Some of the liquid plastic material flowing down this channel or depression 19a is guided toward the relatively narrow channel or depression 20 that leads to the web 17 between the forefinger 12 and the finger 13, as indicated by the arrows 21. Additional plastic material flowing down the palm of the mold will be guided by the channel or depression 22 to the web portion 18 as indicated by the arrows 23, and likewise some of the plastic liquid will be guided to the web portion 19 by the shallow channel or depression 24 as indicated by the arrows 25.

The back side of the mold is also provided with shallow channels or depressions such as those indicated at 26, 28, and 30 between the fingers 12–13, 13–14 and 14–15 respectively, as shown in FIG. 3. In addition, there is provided a relatively wide channel or depression 16b between the thumb and the back portion of the hand as shown in FIG. 2. Thus the liquid plastic flowing down the mold as indicated by the arrows 10a is at least partially guided by the channel or depression 16b to the web 16 as indicated by the arrows 16a. Also some of the liquid plastic is guided down the lower part of the back side of the hand by the channels 26, 28 and 30 to the webs 17, 18 and 19 respectively, as indicated by the arrows 27, 29 and 31 respectively. Thus these webs receive a larger proportion of liquid plastic material during the forming of the glove than would normally be supplied to these web portions whereby additional strength is built into these portions of the glove.

It will also be noted that the cross-sections of the fingers 12, 13, 14 and 15 are somewhat flattened or oval in a direction parallel to the palm of the hand as shown in FIG. 5. This configuration together with the spacing between the fingers facilitates throwing of plating metal onto the surfaces of the webs 17, 18 and 19 when the mold is being plated as previously mentioned, inasmuch as it is desirable to obtain a good coating of plating metal on the surfaces of these webs.

While I have shown a preferred embodiment of the invention, it will be understood that the invention is capable of variation and modification from the form shown so that its scope should be limited only by the scope of the claims appended hereto.

What I claim is:

1. In a mold that is in the general shape of the human hand or other member having finger-like projections that extend therefrom, said mold being adapted to be coated by a liquid out of which a glove is to be formed, said liquid running and spreading on said mold prior to curing or setting thereof into a thin film-like glove that may be removed from the mold, the improvement comprising a mold having the general shape of a human hand with the projecting fingers thereof well spaced, the body portion of said mold having channels formed in the surface of the body portion thereof extending toward the spaces between the roots of the fingers for guiding the flow of liquid flowing down said body portion toward said spaces so that said spaces receive more of said liquid than they would normally receive to form webs of increased strength between the roots of the fingers of the glove formed on the mold.

2. In a mold that is in the general shape of the human hand or other member having finger-like projections that extend therefrom, said mold being adapted to be coated by a liquid out of which a glove is to be formed, said liquid running and spreading on said mold prior to curing or setting thereof into a thin film-like glove that may be removed from the mold, the improvement comprising a mold having the general shape of a human hand with the projecting fingers thereof well spaced approximately to the spacing between the fingers when they are spread apart, the body portion of said hand mold having channels formed in the surface of both the back of the hand and the palm of the hand extending toward the spaces between the roots of the fingers for guiding the flow of liquid from said body portion toward said spaces which would normally not receive as thick a coating of said liquid as other parts of said mold, said channels guiding additional liquid to said spaces to form webs of increased thickness of said liquid between the roots of the fingers.

3. In a mold that is in the general shape of the human hand or other member having finger-like projections that extend therefrom, said mold being adapted to be coated by a liquid out of which a glove is to be formed, said liquid running and spreading on said mold prior to curing or setting thereof into a thin film-like glove that may be removed from the mold; the improvement comprising a mold having the general shape of a human hand with the projecting fingers thereof well spaced by approximately the width of one of said fingers so that the lengths of the webs formed between the adjacent fingers of the gloves formed on the mold approximate the spacing between the fingers of the hand when they are spread apart, the body portion of said mold having channels formed in both the back and the palm surfaces of the body portion thereof extending toward the spaces between the roots of the fingers for guiding the flow of liquid from said body portion toward said spaces to form webs of increased thickness between the roots of fingers.

4. In a mold that is in the general shape of the human hand or other member having finger-like projections that extend therefrom, said mold being adapted to be coated by a liquid out of which a glove is to be formed, said liquid running and spreading on said mold prior to curing or setting thereof into a thin film-like glove that may be removed from the mold, the improvement comprising a mold having the general shape of a human hand with the projecting fingers thereof well spaced and with the cross-sections of the fingers being somewhat flattened in the direction parallel to the palm of the hand, the body portion of said mold having a plurality of channels formed in the surfaces of both the back of the hand and the palm thereof extending toward the webs between the roots of the fingers for guiding the flow of liquid from said back and from said palm toward said webs to increase the thickness of the thin film-like material forming the webs between the fingers.

References Cited in the file of this patent

UNITED STATES PATENTS

| | | |
|---|---|---|
| 1,951,402 | Gammeter | Mar. 20, 1934 |
| 2,125,592 | Spanel | Aug. 2, 1938 |
| 2,451,758 | Malm | Oct. 19, 1948 |
| 2,581,248 | Ganz | Jan. 1, 1952 |